United States Patent [19]

Waddington et al.

[11] 4,249,862
[45] Feb. 10, 1981

[54] DAMPER MEANS FOR HELICOPTER ROTORS

[75] Inventors: Alan Waddington, Somerton; Alfred C. Martin, Shepton Mallet, both of England

[73] Assignee: Westland Aircraft Limited, Yeovil, England

[21] Appl. No.: 857,603

[22] Filed: Dec. 5, 1977

[30] Foreign Application Priority Data

Dec. 8, 1976 [GB] United Kingdom ............... 51308/76

[51] Int. Cl.³ .............................................. B64C 27/38
[52] U.S. Cl. ................................ 416/134 A; 416/140; 416/141
[58] Field of Search ................... 416/134, 134 A, 140, 416/140 A, 141, 107

[56] References Cited

U.S. PATENT DOCUMENTS

| | | | |
|---|---|---|---|
| 2,946,391 | 7/1960 | Lemont | 416/140 A |
| 3,111,172 | 11/1963 | Gorndt et al. | 416/141 |
| 3,378,083 | 4/1968 | Lichten et al. | 416/140 A |
| 3,501,250 | 3/1968 | Mosinskis | 416/134 A |
| 3,556,673 | 1/1971 | Killian | 416/134 A |
| 3,700,352 | 10/1972 | Gorndt | 416/134 A |
| 3,759,631 | 9/1973 | Rybicki | 416/134 A |
| 3,764,230 | 10/1973 | Rybicki et al. | 416/134 A |
| 3,778,189 | 12/1973 | Ferris | 416/134 A |
| 3,790,302 | 2/1974 | Pascher | 416/134 A |
| 3,804,552 | 4/1974 | Covington | 416/134 A |
| 3,862,812 | 1/1975 | Gorndt et al. | 416/141 |
| 3,967,918 | 7/1976 | Mouille et al. | 416/134 A |
| 4,028,002 | 6/1977 | Finney et al. | 416/134 A |
| 4,129,403 | 12/1978 | Watson | 416/134 A |

FOREIGN PATENT DOCUMENTS

| | | | |
|---|---|---|---|
| 1456107 | 12/1968 | Fed. Rep. of Germany | 416/141 |
| 2709199 | 9/1977 | Fed. Rep. of Germany | 416/141 |
| 1138613 | 6/1957 | France | 416/141 |
| 497790 | 12/1938 | United Kingdom | 416/141 |

Primary Examiner—Everette A. Powell, Jr.
Assistant Examiner—A. N. Trausch, III
Attorney, Agent, or Firm—Larson, Taylor and Hinds

[57] ABSTRACT

A helicopter rotor includes a rotor head having, for each of a plurality of rotor blades, an elastomeric bearing and a damper that is arranged to provide controlled restraint of rotor blade movement in both the flap and lead/lag planes. The damper can be arranged to exhibit either substantially equal stiffness in both operational planes or any desired stiffness ratio. In a preferred embodiment of the latter arrangement, the desired stiffness in the respective planes are provided by separate components incorporated in the single damper. The damper may be situated either inboard or outboard of the elastomeric bearing.

11 Claims, 6 Drawing Figures

DAMPER MEANS FOR HELICOPTER ROTORS

THIS INVENTION relates to helicopter rotors.

The control response and manoeuvrability of a helicopter is determined by control moments produced in the rotor by flapping movements of each of a plurality of rotor blades. The control moments are determined by the flap hinge offset, i.e. the amount by which a flap hinge is offset from the axis of rotation, and in general the greater the offset the higher are the control moments due to the increased moment produced at the rotor head.

Articulated rotor heads are known in which rotor blade flap, lead/lag and feathering movements are provided by mechanical hinges comprising ball or roller bearings. Such rotor heads are generally large and complex, and suffer from high aerodynamic drag during operation and require frequent maintenance and servicing attention due to the extremely high centrifugal loads encountered, the continuous small, rotational movements necessary and the need to provide for lubrication of the mechanical hinges. Such rotor heads are further complicated by the need to provide lead/lag dampers to prevent ground resonance problems and, in some cases, powered blade folding mechanisms.

It follows, therefore, that to increase the flap hinge offset in such a rotor head will add to the problems by further complicating the construction and the control system and resulting in a larger and heavier rotor head that will cause even higher drag loads during operation.

It has been proposed to replace mechanical bearings by elastomeric bearings providing for rotor blade flap and lead/lag movements to take place about a common bearing centre. Such elastomeric bearings, which can also be arranged to provide for blade feathering movements, are capable of withstanding the high centrifugal loads encountered in a helicopter rotor during operation.

This substitution of elastomeric bearings for mechanical bearings has simplified the construction of articulated rotors by enabling all the required movements of a blade to be accommodated by a single bearing that requires no lubrication, thus reducing servicing and maintenance requirements. However, it has not solved the problem of necessarily increasing the size, in particular the overall diameter, of the rotor head if it is required to improve the control response in a particular case because it is still necessary for this purpose to position the bearing, and therefore the bearing centre, more outwardly in order to increase the flap hinge offset. This, in turn, results in a corresponding increase in the length of pitch control levers, and in the dimensions of either a swashplate or a spider operating mechanism.

Accordingly, the invention provides a helicopter rotor including a rotor head arranged, during operation, to support a plurality of rotor blades for rotation about an axis, the rotor head including, for each rotor blade, an elastomeric bearing, a damper and means interconnecting the bearing and the damper; the means protruding from the rotor head for attachment of a rotor blade at an outer end thereof, whereby the elastomeric bearing permits blade flap, lead/lag and feathering movements of the rotor blade and the damper provides controlled restraint of rotor blade movement in the flap and lead/lag planes.

The elastomeric bearing may be hollow and, conveniently, the interconnection means may comprise a spindle housed within the hollow bearing and fixedly attached thereto.

Preferably, a universal bearing is interposed between the spindle and the damper whereby the spindle is free to rotate about its axis relative the damper in response to feathering movements of the blade, but lateral movements of the spindle due to rotor blade flap and lead/lag movements are transmitted to the damper.

In one embodiment, the damper may comprise at least one annular elastomer layer bonded to a surface of a flange attached to the universal bearing and to a flange formed on a support member attached to the rotor head so that the or each layer operates in shear in both the flap and lead/lag planes to exhibit substantially equal stiffness in both planes. Preferably the or each elastomer layer comprises a layer of synthetic rubber the high hysteresis characteristics of which provide desired damping properties in the lead/lag plane.

Alternatively, the damper may comprise a plurality of elastomer layers, preferably of synthetic rubber, bonded between interengaged leg portions of support members attached to the bearing and the rotor head respectively. Conveniently, the leg portions may extend generally parallel to a longitudinal axis of the spindle. The interengaged leg portions may be arranged in perpendicularly opposed planes corresponding with the flap and lead/lag planes of movement of the rotor blade so as to exhibit substantially equal stiffness in the respective planes. Alternatively the interengaged leg portions may be arranged other than perpendicularly so that at least in one of the operational planes, the elastomer layers operate partly in shear and partly in compression to facilitate the selection of a desired different stiffness ratio between the respective planes.

In a further, preferred, embodiment, the damper may include an elastomeric assembly interposed between the support member(s) and the rotor head at both sides of the longitudinal axis of the spindle, the elastomeric assemblies being oriented in a plane generally parallel with a blade flap plane. Preferably, each elastomeric assembly comprises a bonded assembly having a plurality of alternate layers of natural rubber and metal so as to be stiff in compression and, owing to the low hysteresis of the natural rubber, of low stiffness in shear to permit a desired ratio of movement in the respective planes to be selected to suit particular applications.

An inner surface of each elastomeric assembly may be attached to an outer surface of diametrically opposed flat portions provided on a generally tubular inner housing secured to the support member(s), and an outer surface of each elastomeric assembly may be attached to an inner surface of a generally tubular outer housing fixedly attached to the rotor head.

Conveniently, the damper is situated inboard of the elastomeric bearing, the spindle being extended inwardly for attachment to the damper.

The invention will now be described by way of example only and with reference to the accompanying drawings in which, FIG. 1 is a part sectioned fragmentary plan view of one embodiment of a helicopter rotor constructed in accordance with the invention;

Figure 1:
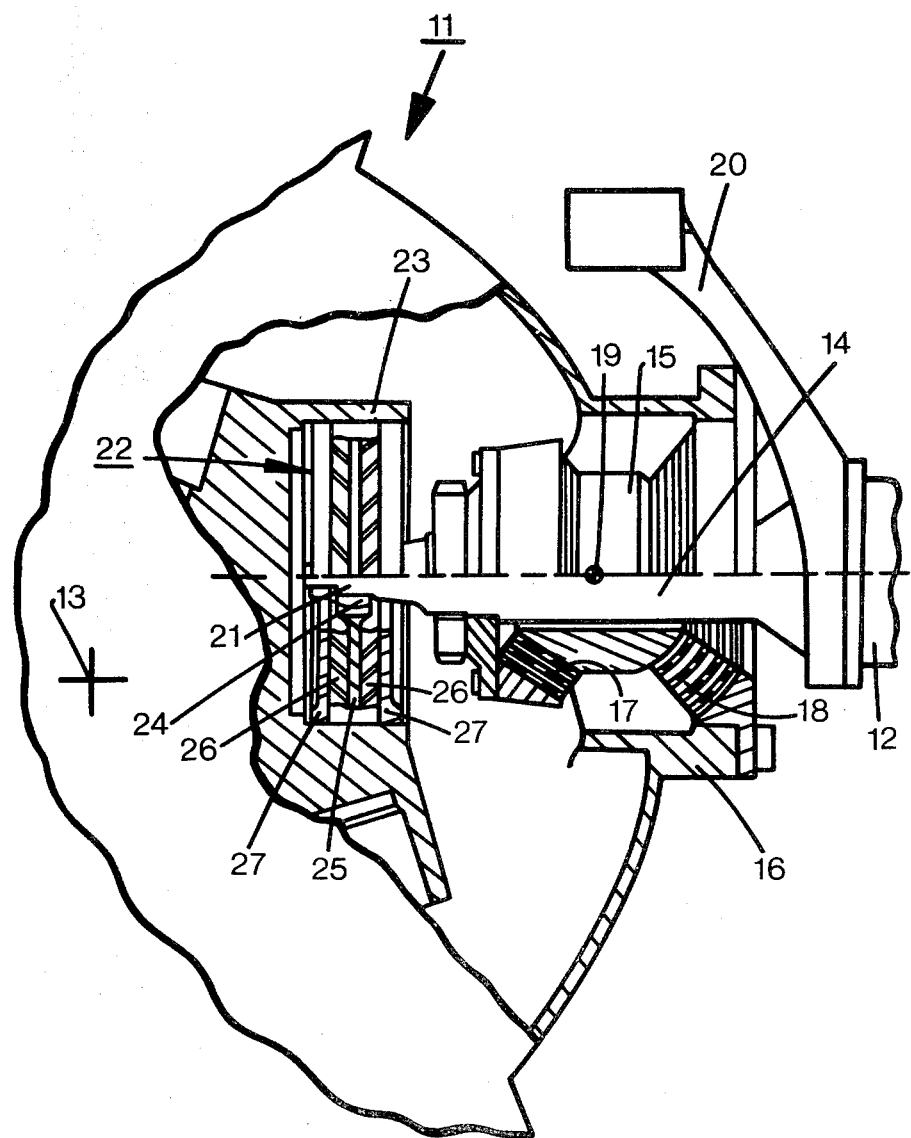

The helicopter rotor illustrated in FIG. 1 includes a rotor head, generally indicated at 11, arranged to support a plurality of rotor blades 12 (one only being shown) for rotation about an axis 13.

Each rotor blade 12 is attached at an outer end of a spindle 14 that extends inwardly into a generally hollow interior of the rotor head 11. The spindle 14 is supported between its ends in a hollow elastomeric bearing 15 fixedly attached to an outwardly facing surface of a generally circular hollow flange 16 formed on the rotor head 11. The elastomeric bearing 15 comprises in-series conical and part-spherical bearing elements 17 and 18 respectively arranged about a common geometrical centre 19 and, during operation, permits rotor blade flap, lead/lag and feathering movements. A pitch control lever 20 is connected to flying controls (not shown) to change the pitch of each rotor blade 12.

An inner end 21 of the spindle 14 is operatively associated with an elastomeric damper 22 that is situated inboard of and spaced-apart from the bearing 15, and is fixedly attached in a hollow boss 23 formed in the rotor head 11.

A part-spherical universal bearing 24 is interposed between the inner end 21 of the spindle 14 and a radially outwardly extending flange 25, and annular elastomer layers 26 are bonded between the surfaces of the flange 25 and adjacent surfaces of radially inwardly extending flanged support members 27. The peripheries of support members 27 are fixedly located in the hollow boss 23.

Figure 2:
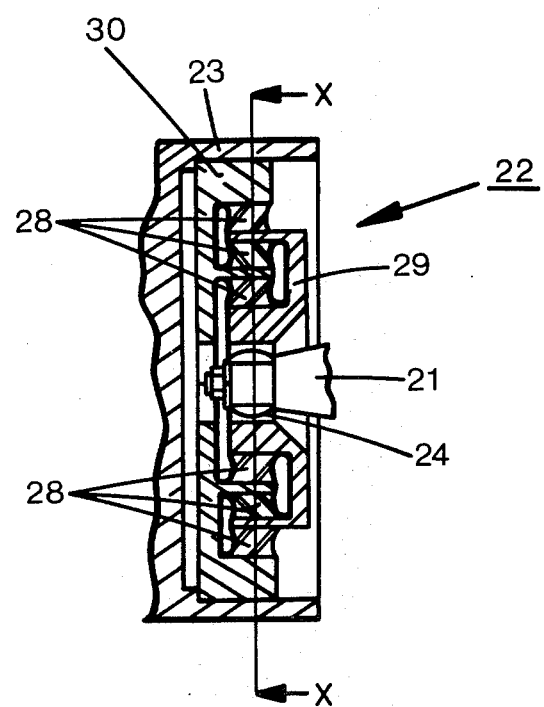
FIG. 2 is a fragmentary sectioned view of a modification in part of the embodiment of FIG. 1.
Figure 3:
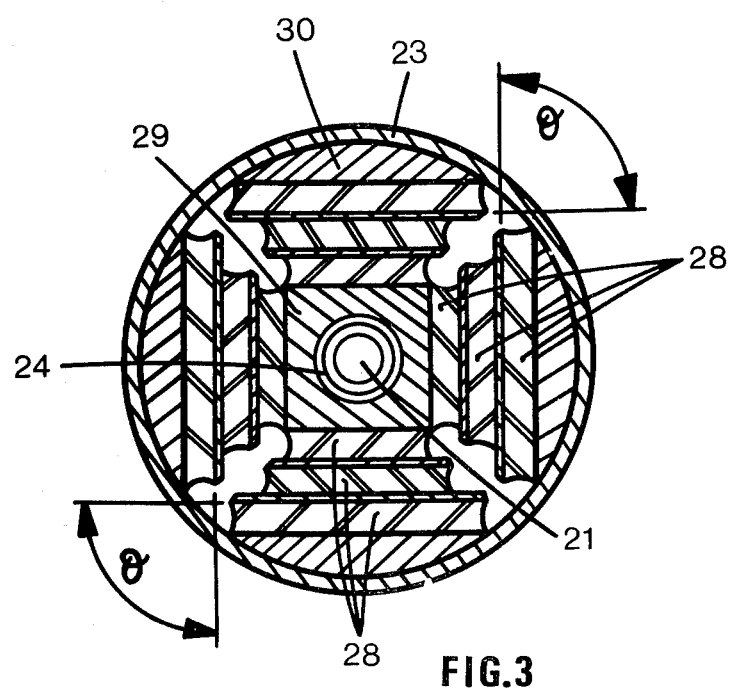
FIG. 3 is a sectioned view taken along lines X—X of FIG. 2.

FIGS. 2 and 3 illustrate a modification of the damper 22 shown in FIG. 1, in which a plurality of linear elastomer layers 28 are bonded to surfaces of interengaging generally U-shaped leg portions formed on a support member 29 carried by the universal bearing 24 and a support member 30 fixedly located in the hollow boss 23. From FIG. 3 is will be seen that the elastomer layers 28 are arranged perpendicularly as indicated at $\theta$ and are aligned respectively with the flap and lead/lag planes of movement of an attached rotor blade.

Figure 4:
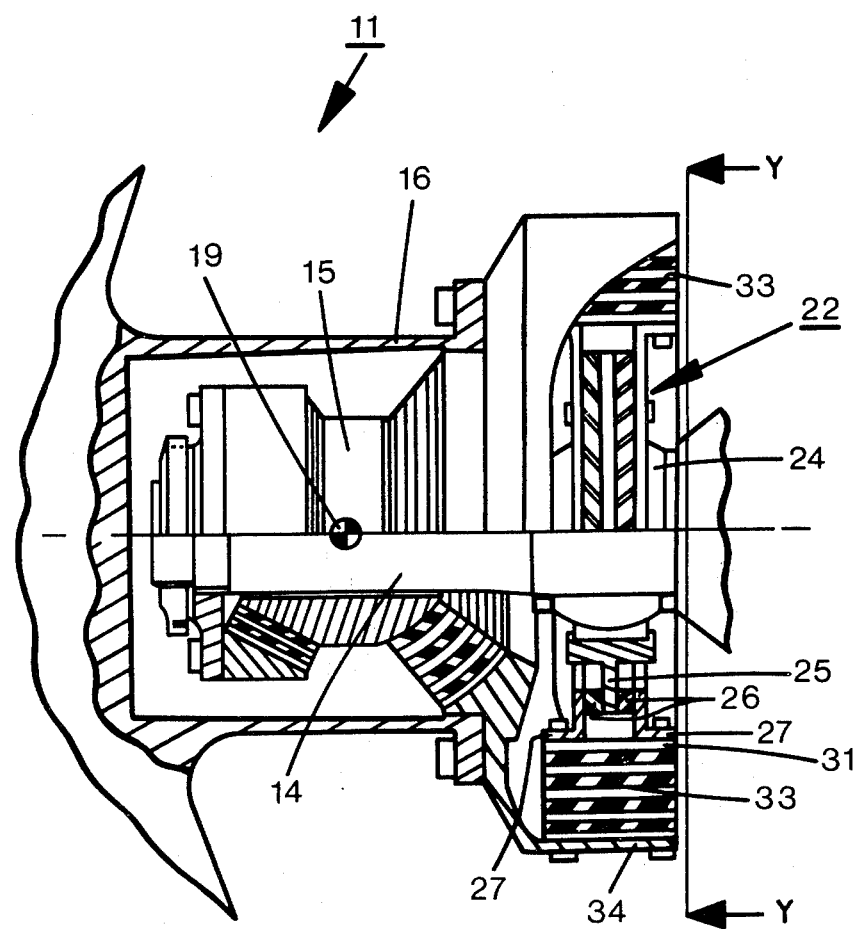
FIG. 4 is a view similar to FIG. 1 and illustrating a further embodiment.
Figure 5:
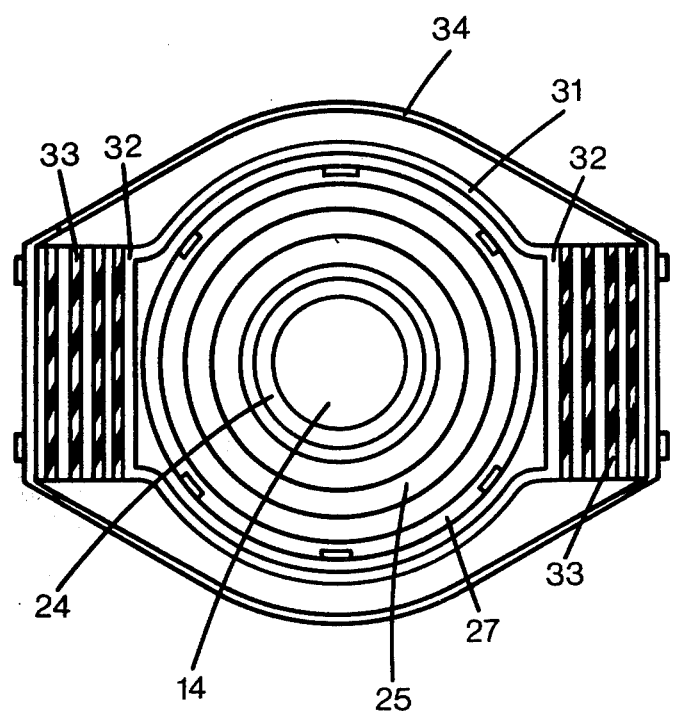
FIG. 5 is an end elevation taken along lines Y—Y of FIG. 4.

In the embodiment of FIGS. 4 and 5, the damper 22 is situated outboard of the elastomeric bearing 15. The damper 22 is similarly connected through bearing 24 to a radially outwardly extending flange 25, and annular elastomer layers 26 are again bonded between the surfaces of the flange 25 and adjacent surfaces of radially inwardly extending flanged support members 27.

The support members 27 are fixedly attached to an inner surface of a generally tubular inner housing 31 which, as shown in FIG. 5, is provided with diametrically opposed vertical flat portions 32.

An elastomeric assembly 33 is attached to each surface 32 and comprises a bonded assembly of alternate layers of elastomer and metal oriented in a plane parallel to a flap plane of an attached rotor blade. An outer surface of each elastomeric assembly 33 is fixedly attached to an inner surface of a generally tubular outer housing 34 formed integral with an outer support member of the part-spherical bearing part 18 of elastomeric bearing 15, as best shown in FIG. 4.

Figure 6:
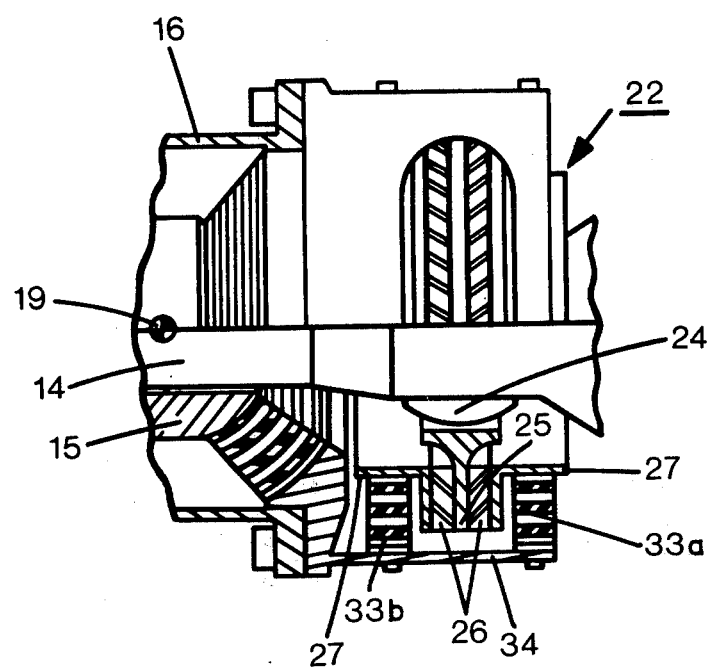
FIG. 6 is a fragmentary sectioned view of a modification of part of the embodiment of FIG. 4.

FIG. 6 illustrates a modification of the damper 22 of FIGS. 4 and 5 in which the flange portion of support members 27 is located inboard of elastomer layers 26, and each elastomeric assembly 33 is split into two portions 33a and 33b located at opposite sides of layers 26.

Because part of the radial width of portions 33a and 33b overlaps the annular layers 26, this modification facilitates a significant reduction in the overall size of tubular outer housing 34, as will be apparent from a comparison of FIGS. 4 and 6 respectively.

In operation of a rotor constructed as illustrated in the drawings, rotor blade flap, lead/lag and feathering movements are transmitted through the spindle 14 and are permitted by the elastomeric bearing 15. The bearing 24 serves to isolate the damper 22 from blade feathering movements that cause rotation of the spindle 14 about its longitudinal axis, whereas blade flap and lead/lag movements are transmitted through the spindle 14 to the damper 22.

In the embodiment of FIG. 1 the elastomer layers 26 of the damper 22 operate in shear during both flap and lead/lag movements of the rotor blade 12 and are equally stiff in both the flap and lead/lag planes. Preferably, the elastomer layers comprise layers of synthetic rubber that, because of its high hysteresis characteristics, provides the necessary damping in the lead/lag plane.

The respective perpendicularly oriented layers of elastomer 28 of the modification of FIGS. 2 and 3 are also comprised of synthetic rubber, but operate in shear in one of the flap or lead/lag planes and in compression in the other of these planes. In the form illustrated, the damper 22 also exhibits substantially equal stiffness in both planes: however, by varying angle $\theta$, the layers 28 can be arranged so that at least in one of the planes, the layers operate partly in shear and partly in compression thereby facilitating the selection of a suitable different stiffness ratio in the respective planes of operation.

Some helicopter rotor designs require that the degree of motion in the blade flap plane is as much as three or four times the degree of motion in the blade lead/lag plane, and the embodiment of FIG. 1 and the modifications of FIGS. 2 and 3 may be unsuitable for such an arrangement as a result of providing the high stiffness required sfor damping in the lead/lag plane precluding the desired degree of motion in the flap plane. The embodiment of FIGS. 4 to 6 caters for such a requirement by providing separate components within a single damper assembly that are effective in the flap and lead/lag planes respectively.

In FIGS. 4 to 6, the damper 22 is shown situated outboard of the elastomeric bearing 15: however, it is to be understood that the damper 22 could instead by situated inboard of the bearing 15, as in FIGS. 1 to 3.

In the embodiment of FIGS. 4 and 5, the damper 22 comprises annular layers 26 of synthetic rubber providing high stiffness characteristics to ensure a desired degree of damping in the lead/lag plane. Each of the elastomeric assemblies 33 comprises alternate layers of natural rubber and metal plates oriented in a plane parallel to a blade flap plane, thereby providing a high stiffness in compression (the lead/lag plane) and, due to the low hysteresis of natural rubber, a low stiffness in shear (the flap plane) thereby permitting a desired ratio of movement in the respective operational planes.

The tubular outer housing 34 is of a flattened configuration elongated in the lead/lag plane to encompass the elastomeric assemblies 33. Housing 34 is spaced from the inner housing 31 at the top and bottom by an amount sufficient to permit the necessary degree of flap motion of the inner housing 31 relative the outer housing 34. This flattened configuration serves to minimise the frontal area presented in the direction of rotation thereby minimising aerodynamic drag encountered during operation.

The modification of FIG. 6 operates in a similar manner to that described in relation to FIGS. 4 and 5: however, the construction employed that results in a reduced overall space envelope will be of benefit in an arrangement in which the damper 22 is located inboard of the elastomeric bearing 15.

Thus, in a rotor according to the invention, the damper acts as a conventional damper in the lead/lag plane and the restraint provided by its inherent stiffness in the flap plane establishes a virtual, or effective, flap hinge position that is outboard of the actual hinge position defined by the geometrical centre of the elastomeric bearing 15. It will therefore be apparent that the invention enables an increased flap hinge offset to be effectively achieved without having to physically extend the distance of the actual flap hinge offset from the axis of rotation, thereby resulting in a more compact rotor head and improved control response. Alternatively, if an existing actual flap hinge offset is considered to provide adequate control response, then the invention will facilitate a reduction in the overall diameter of the rotor head by reducing the actual flap hinge offset position without detriment to the control response characteristics.

As an example only of the use of the present invention, a particular helicopter has a conventional articulated rotor with a flap hinge offset of 3.4 percent of blade radius measured from the axis of rotation. Incorporation of the present rotor head with an actual flap hinge offset of 3.4 percent provides a virtual flap hinge offset of 5.2 percent thereby improving the control response of the rotor and, therefore, the manoeuvrability of the helicopter without increasing the overall diameter of the rotor head.

The reduction in size of rotor head achievable by this invention results in a compact assembly thereby reducing aerodynamic drag without an attendant loss of performance, and also results in a reduced weight and simplification of control systems. The arrangement also facilitates the selection of any desired stiffness ratio, including matched stiffness, between the flap and lead/lag planes of a rotor to suit any particular application. Furthermore, the desired stiffness ratio is achieved, for each rotor blade, in a single unit thereby simplifying construction and reducing weight.

The use of elastomeric bearings results in further simplification and a reduction in maintenance and servicing requirements. These are further enhanced by the use of a hollow rotor head structure in which the operational parts are housed thereby precluding the ingress of dirt and moisture. The hollow structure also facilitates the design of an aerodynamically clean rotor head thereby further reducing operational drag.

The helicopter rotor of this invention may be used as either a main rotor or an anti-torque rotor.

Whilst several embodiments have been described and illustrated, it is to be understood that many modifications may be made without departing from the scope of the invention as defined in the following claims.

We claim as our invention:

1. A helicopter rotor including a rotor head and a plurality of rotor blades, means for supporting the rotor blades by the rotor head for rotation about an axis, each rotor blade supporting means comprising a spindle attached to the rotor blade, the spindle extending inwardly into the rotor head, a hollow elastomeric bearing for the rotor blade, the hollow bearing having a geometrical centre about which rotor blade flap and lead/lag movements occur during operation, and a generally annular elastomeric damper assembly for the rotor blade, the damper mounted on the rotor head generally transversely of a longitudinal axis of the spindle and being spaced apart axially from the elastomeric bearing, said spindle being operatively connected to said damper so as to be free to rotate about its axis relative the damper in response to feathering movements of the rotor blade and so that lateral movements of the spindle due to rotor blade flap and lead/lag movements are transmitted to the damper, whereby said damper provides controlled restraint of rotor blade movement in both the flap and lead/lag planes.

2. A helicopter rotor according to claim 1 and further including a universal joint interposed between the spindle and damper assembly, a support member attached to the rotor head and said damper including at least one annular elastomer layer disposed between said support member and said universal joint.

3. A helicopter rotor according to claim 2 wherein said elastomer layers comprises a layer of synthetic rubber.

4. A helicopter rotor according to claim 1 wherein said damper comprises a plurality of elastomer layers.

5. A helicopter rotor according to claim 1 and said damper assembly including support members attached to said bearing and said rotor head, said support members having leg portions and a plurality of elastomer layers bonded to said leg portions.

6. A helicopter rotor according to claim 5 wherein said leg portions are disposed in generally perpendicularly opposed planes corresponding to the flap and lead/lag planes of movement of the rotor blade.

7. A helicopter rotor according to claim 1 wherein said damper assembly includes a support member and elastomeric layers interposed between the support member and the rotor head at both sides of the longitudinal axis of the spindle, said elastomeric layers being oriented in a plane generally parallel with a blade flap plane.

8. A helicopter rotor according to claim 7 wherein a plurality of alternate layers of metal are interposed between said elastomeric layers.

9. A helicopter rotor according to claim 7 wherein said elastomeric layers comprise layers of natural rubber.

10. A helicopter rotor according to claim 1 wherein said damper assembly is disposed inboard of said elastomeric bearing.

11. A helicopter rotor according to claim 1 wherein said damper assembly is disposed outboard of said elastomeric bearing.

* * * * *